(12) United States Patent
Zhang

(10) Patent No.: US 7,115,851 B2
(45) Date of Patent: Oct. 3, 2006

(54) HELIOSTAT DEVICE

(76) Inventor: Yaoming Zhang, No. 30 Andeli, West Yuhua Road, Nanjing City, Jiangsu Province 210012 (CN)

( * ) Notice: Subject to any disclaimer, the term of this patent is extended or adjusted under 35 U.S.C. 154(b) by 243 days.

(21) Appl. No.: 10/929,993

(22) Filed: Aug. 30, 2004

(65) Prior Publication Data
US 2006/0042624 A1    Mar. 2, 2006

(51) Int. Cl.
*G01C 21/02* (2006.01)
*F24J 2/38* (2006.01)

(52) U.S. Cl. .................... 250/203.4; 126/576; 126/605

(58) Field of Classification Search ............ 250/203.1, 250/203.3, 203.4; 126/576–577, 600, 605–606, 126/687; 359/853
See application file for complete search history.

(56) References Cited

U.S. PATENT DOCUMENTS

| | | | |
|---|---|---|---|
| 4,586,488 A | | 5/1986 | Noto |
| 4,883,340 A | | 11/1989 | Dominguez |
| 5,798,517 A | * | 8/1998 | Berger ...................... 250/203.4 |
| 6,231,197 B1 | * | 5/2001 | Nakamura .................. 359/853 |
| 6,465,766 B1 | | 10/2002 | Zhang |

FOREIGN PATENT DOCUMENTS

EP        1 033 591 A2      6/2000

\* cited by examiner

*Primary Examiner*—Kevin Pyo
(74) *Attorney, Agent, or Firm*—Hanley, Flight & Zimmerman, LLC

(57) ABSTRACT

Heliostat devices are disclosed. A disclosed heliostat device comprises planar reflectors and their frame, an azimuth angle adjusting mechanism and an altitudinal angle adjusting mechanism, and a sunlight tracking sensor. This device can perform sun tracking and accurate projection in fixed direction, via the directed sensor mounted in the fixed projection direction to form multi-stage control sensors.

12 Claims, 11 Drawing Sheets

HELIOSTAT DEVICE

FIELD OF THE DISCLOSURE

This disclosure relates generally to solar energy utilization, and, more particularly, to heliostat devices that can be used for lighting or thermal power generation using solar energy.

BACKGROUND

The heliostat is an important device frequently involved in the utilization of solar energy, and it is mainly used in lighting or thermal power generation with solar energy.

For instance, in thermal power generation with a tower using solar energy, the solar heat radiation is reflected by a number of heliostats to a solar receiver mounted on top of a high tower, to heat the medium to produce superheated steam, or to directly heat water in the heat collector to produce superheated steam, which then drives the turbo-generator set to generate electricity, thus converting solar energy into electrical energy. To enable the solar radiation to be reflected onto the fixed receiver by reflectors at all times during the day, a tracking mechanism must be provided for the reflectors. To control the tracking mechanism, two forms are mainly adopted nowadays, namely, programmed control and control by sensors. With programmed control, the movement of the dual-shaft tracking mechanism is controlled according to the calculated sun movement route. Programmed control has the shortcoming of accumulated error and high cost. With control by sensors, the movement of the tracking mechanism is controlled according to the incident sun radiation direction measured by the sensors. Control by sensors has the shortcomings that: (a) it cannot control the reflected light directly, (b) as there is mechanical error in precision that cannot be overcome, it is difficult to ensure accurate tracking and positioning by solely relying on the tracking sensors mounted on the tracking mechanism, and (c) it cannot realize stable and reliable control.

BRIEF DESCRIPTION OF THE DRAWINGS

FIG. 1-2 shows the locally enlarged structure in FIG. 1-1.

FIG. 1-3 is the enlarged schematic of local structure I in FIG. 1-2.

FIG. 2 is the detailed structure of a specific driving mechanism for the sensor in FIG. 1-1.

FIG. 3 shows the principle of directed sun tracking.

FIG. 5-1 is the schematic of the structure of the second example Embodiment.

FIG. 5-2 is the enlarged schematic of local structure I in FIG. 5-1.

FIG. 5-3 is the schematic of another structure of the second example Embodiment 2.

FIG. 5-4 is the enlarged schematic of local structure II in FIG. 5-3.

DETAILED DESCRIPTION

Embodiment 1

Figure 1:
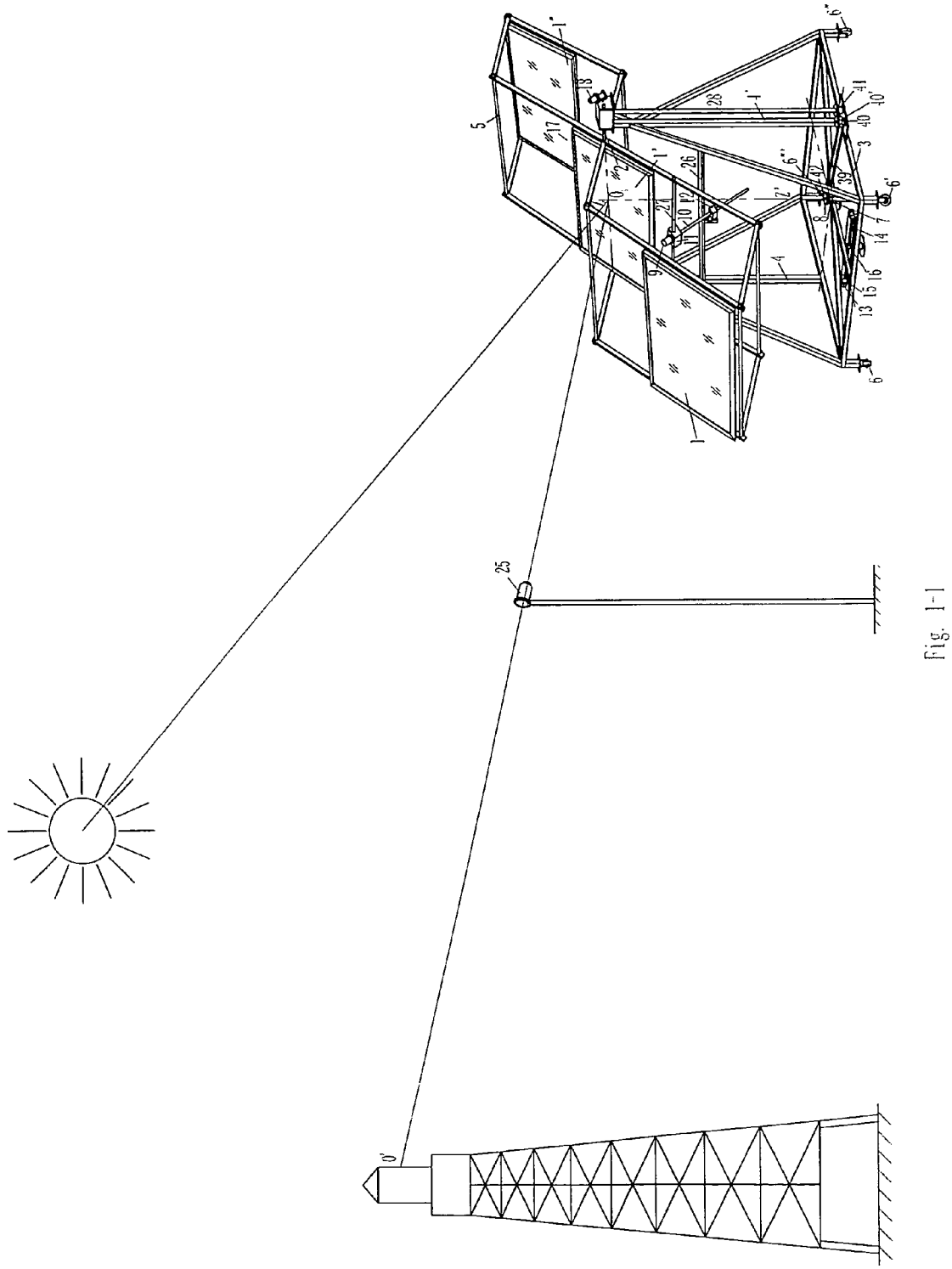
FIG. 1-1 is the structure schematic of a first example heliostat device constructed in accordance with the teachings of this invention.
Figures 1, 2:
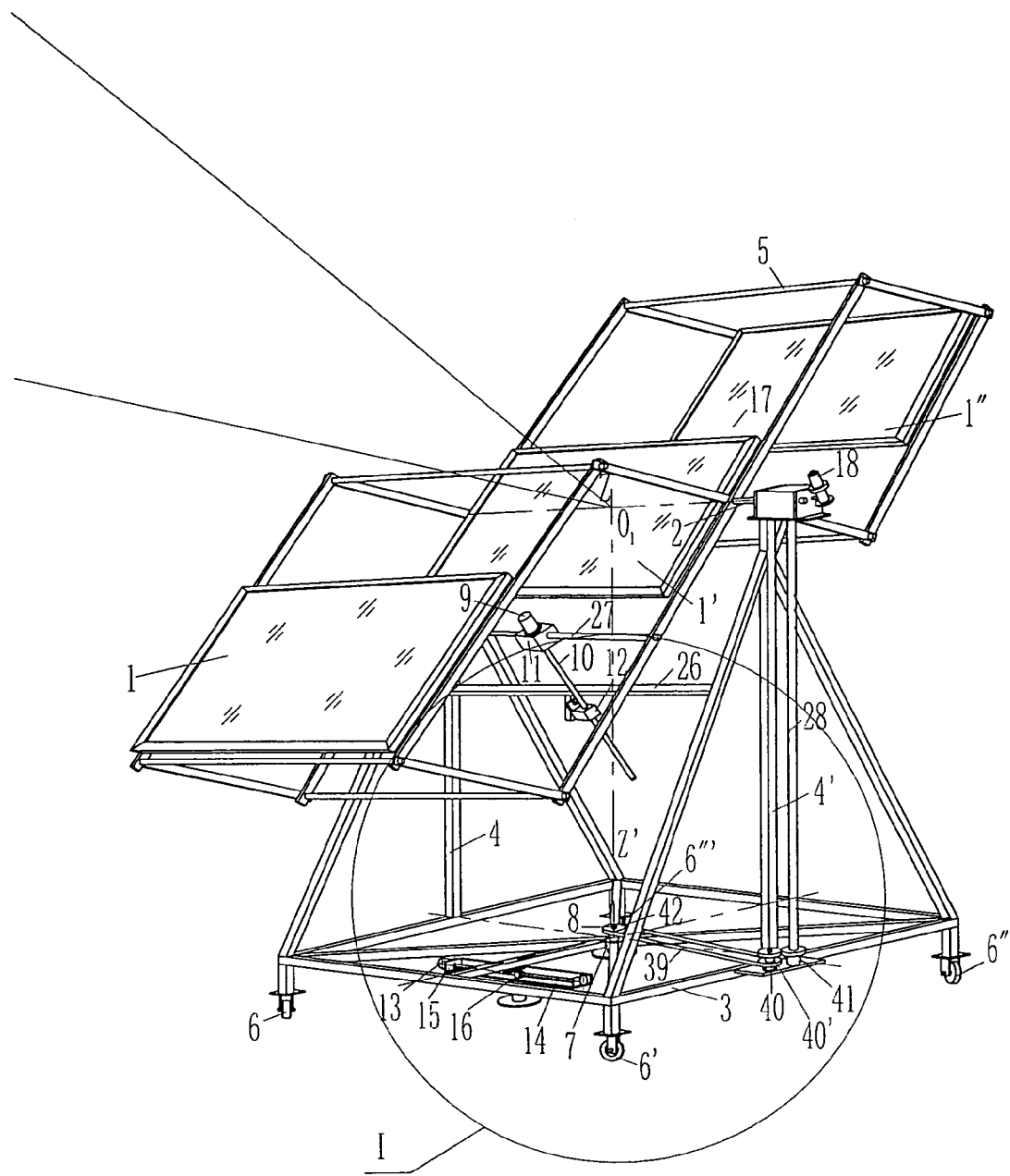
Figures 1, 2, 3:
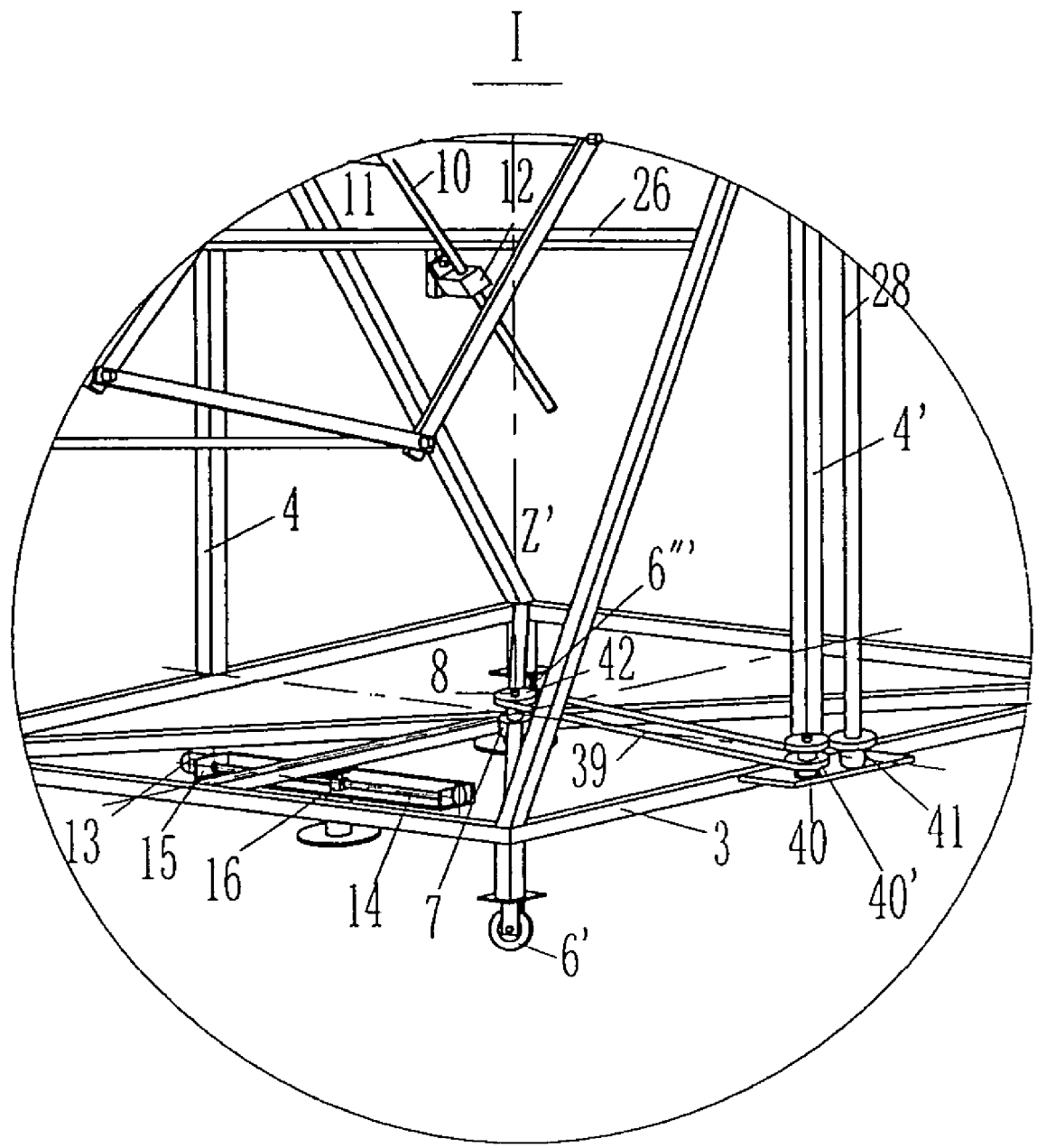
Figure 2:
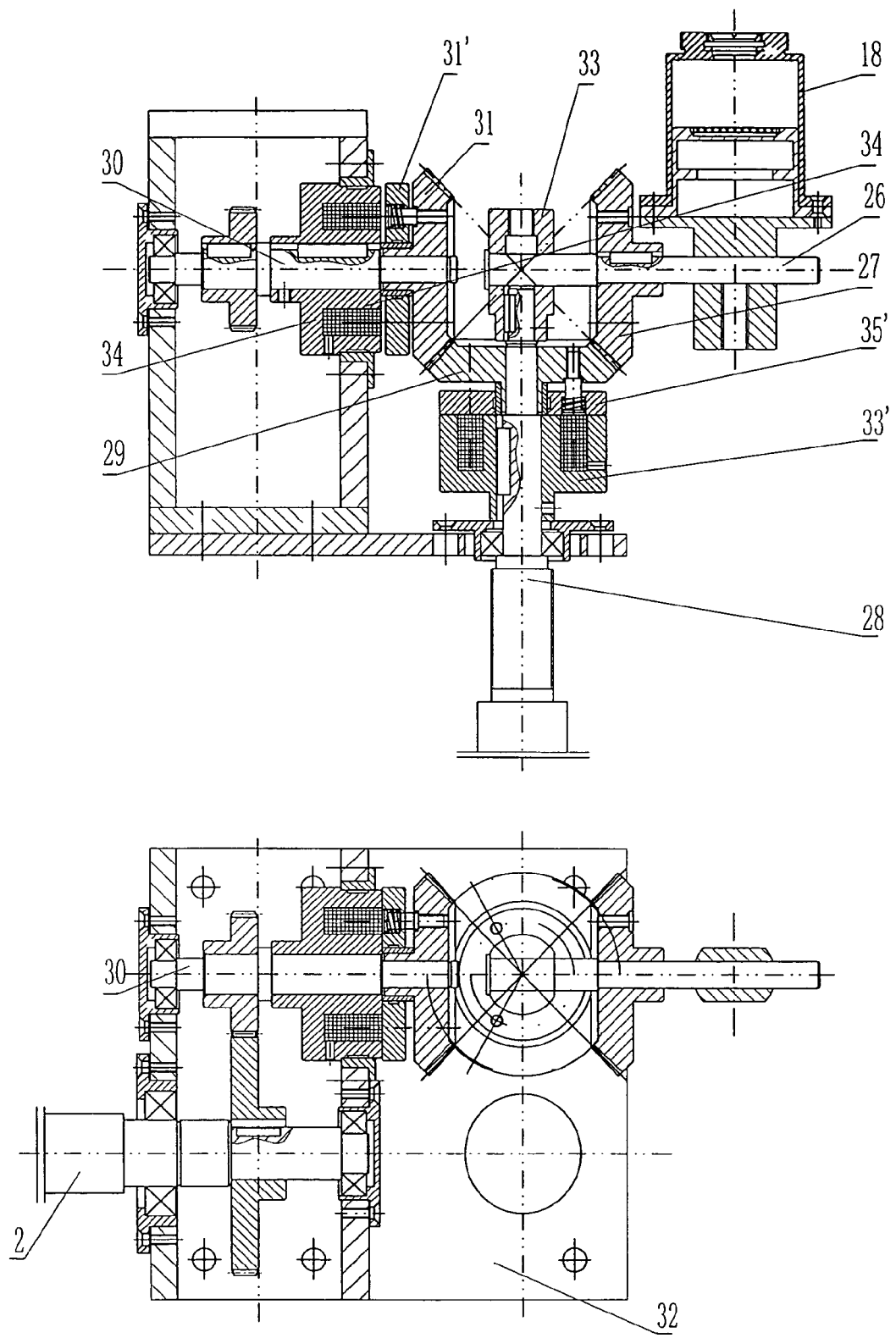
Figure 3:
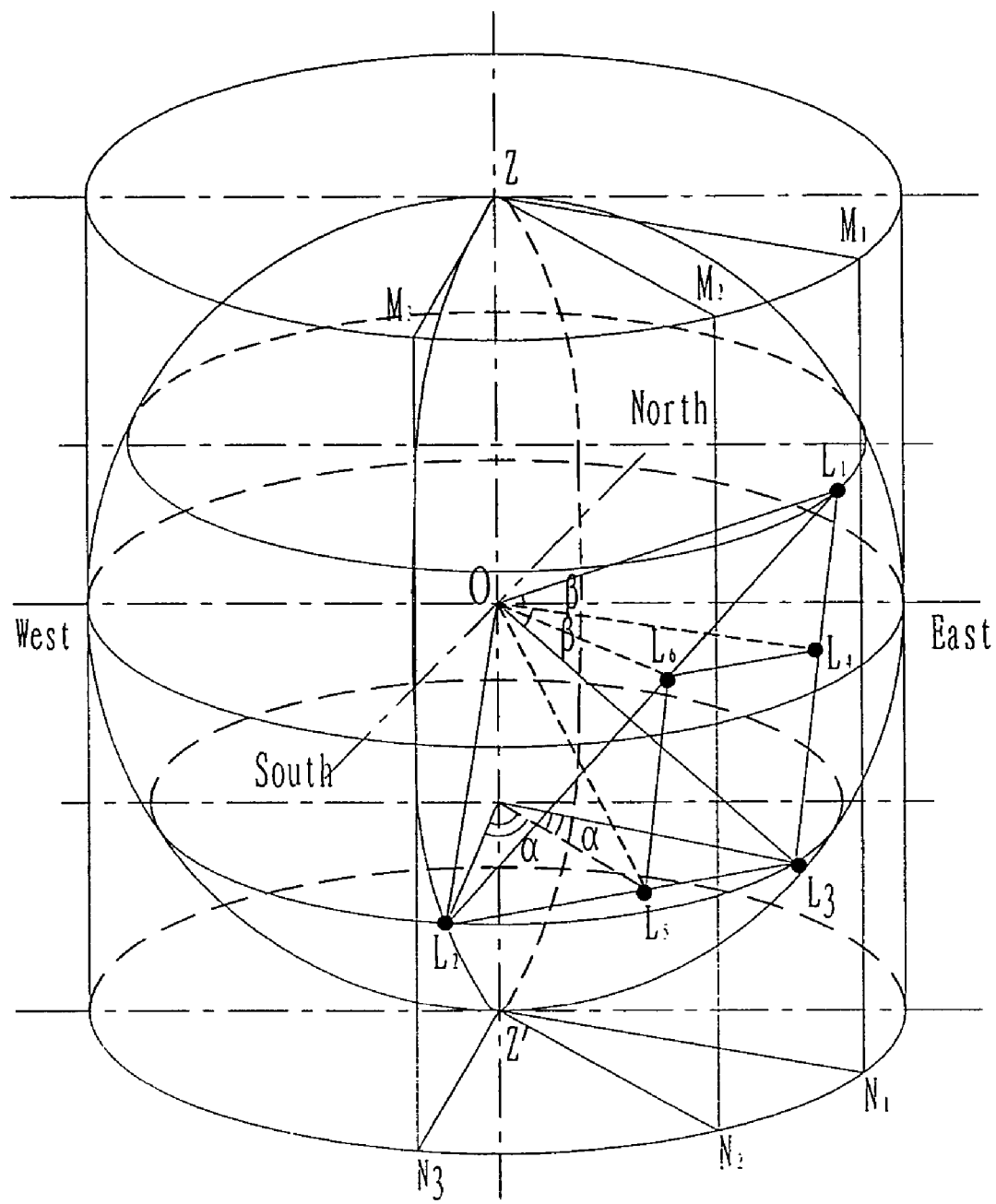

In this Embodiment, the heliostat device has the structure as shown in FIG. 1-1, and the local structure is enlarged as shown in FIGS. 1-2 and 1-3. It includes three planar reflectors 1, 1' and 1", the planar reflectors azimuth angle adjusting mechanism and altitudinal angle adjusting mechanism and the multi-stage control sensors including sunlight tracking sensor 18 and directed sensor 25. The azimuth angle adjusting mechanism includes the vertical shaft 8 with ZZ' as the central axial line and its sleeve 7, the altitudinal angle adjusting mechanism includes at least one transversal main turning shaft 2 parallel with the planar reflectors, the axial line of the said vertical shaft 8 and the axial line of transversal main turning shaft 2 intersect in space at point $O_1$, the point $O_1$ basically coincides with the center of planar reflector 1', and the center of the directed projection area is set as the point O' on the tower.

The azimuth angle adjusting mechanism also includes the bottom support 3 that rotates around the axial line ZZ' of vertical shaft 8, the vertical supports 4 and 4' fixed on both sides of bottom support 3, and the driving mechanism linked with the bottom support. The planar reflectors 1, 1' and 1" are mounted mutually parallel and symmetrically on the corresponding connecting rods of parallel connecting rod mechanism frame 5, which is rotatably supported on vertical supports 4 and 4' via transversal main turning shaft 2. The said bottom support 3 has at least three rollers supporting on the horizontal ground (shown as 6, 6' 6" and 6''' in this Embodiment), and the whole heliostat device is supported on the ground by the four rollers 6, 6' 6" and 6''' under the bottom support 3. The azimuth angle driving mechanism mainly comprises the motor 13, screw 14 and its supporting base 15 and nut 16. The output shaft of motor 13 is connected with one end of the screw 14, and both ends of screw 14 are supported on the supporting base 15 and the screw 14 is spirally engaged with nut 16. Nut 16 is pivoted on bottom support 3, and the supporting base 15 is supported on the ground. In this Embodiment, the vertical shaft 8 is fixed on the ground, and fitted in sleeve 7, which is located in the center of bottom support 3 and is rigidly connected with bottom support 3. The azimuth angle driving mechanism drives the bottom support 3 and the planar reflectors and their frame on it to rotate around the central axial line ZZ' of vertical shaft 8.

The drive for the altitudinal angle adjusting mechanism mainly comprises motor 9 and its supporting base 11, screw 10 and nut 12. The nut 12 is pivoted on the connecting member 26 between the vertical supports 4 and 4', the output shaft of motor 9 is connected with one end of screw 10, and the supporting base 11 is pivoted on the connecting member 27 of the two connecting rods of the parallel connecting rod mechanism. The altitudinal angle driving mechanism drives the parallel connecting rod mechanism frame 5 and the planar reflectors on it to rotate around the axial line of transversal main turning shaft 2, and also adjusts the distance between planar reflectors at the same time.

The sunlight tracking sensor 18 in the heliostat device in this Embodiment can be the similar sensor previously used, such as the structure and principle for U.S. Pat. No. "6,465,766B1" (which is hereby incorporated herein by reference in its entirety) previously applied by and awarded to this Applicant.

What is special is the transitional driving mechanism connecting vertical shaft 8 and transversal main turning shaft 2 with this sensor 18. As shown in FIG. 2, sunlight tracking sensor 18 is mounted and fixed on rotating shaft 26, which is also rigidly connected with bevel gear 27, the rotating shaft 26 is pivoted at one end on the sleeve 33 rigidly fixed with the azimuth shaft 28. Bevel gear 27 is engaged with azimuth bevel gear 29 freely rotating on azimuth shaft 28, and this azimuth bevel gear 29 is also engaged with the altitudinal bevel gear 31 freely rotating on altitudinal shaft 30. Azimuth shaft 28 and altitudinal shaft 30 are perpendicular to each other, and are mounted on base 32, respectively fixed with the electromagnetic clutches 33' and 34 that can make the free bevel gears rotate with the shafts. Both electromagnetic clutches are mutually interlocked, and the respective clutch plates 35' and 31' can slide along the pins on azimuth bevel gear 29 and altitudinal bevel gear 31. The three bevel gears 27, 29 and 31 are in the same diameter.

According to the principle of geometrical optics, to reflect the sunlight to a fixed direction, the change in the azimuth angle and altitudinal angle of the normal line of the planar reflector should be respectively half of the change in azimuth angle and altitudinal angle of the sun. This can be explained and verified in FIG. 3. As shown in FIG. 3, in $\Delta OL_1L_2$, $OL_6$ is the angular bisector, in $\Delta OL_1L_3$, $OL_4$ is the angular bisector, in $\Delta OL_2L_3$, $OL_5$ is the angular bisector, and plane $M_2ZZ'N_2$ is the angular bisector plane of the angle formed by the plane $M_1ZZ'N_1$ and plane $M_3ZZ'N_3$. We need to reflect the sunlight from point $L_1$ to point O out in the direction $OL_2$ after it passes the heliostat device at point O. For this purpose, we should divide the process into two steps. First, let the normal line of the planar reflector change by $\beta$ as half of the changing angle $2\beta$ in the altitudinal angle, then change by $\alpha$ as half of the changing angle $2\alpha$ in the azimuth angle, so that the sunlight is reflected in the direction $OL_2$ from the direction $L_1O$. This is the theoretical basis we apply to use the sunlight tracking sensor 18 to track the sun position and to realize directed projection.

In this way, as the change in the azimuth angle of planar reflectors is realized by bottom support 3 rotating around the central axial line ZZ', and the change in altitudinal angle realized by the parallel connecting rod mechanism rotating around the axial line of transversal main turning shaft 2, while the movement of sunlight tracking sensor 18 is performed directly by altitudinal shaft 30 and azimuth shaft 28, therefore links must be established respectively between the altitudinal shaft 30 and transversal main turning shaft 2 and between azimuth shaft 28 and the vertical shaft 8 via the driving mechanism, so that the change in azimuth angle and altitudinal angle of the normal line of the planar reflector is respectively half of the change in the azimuth angle and altitudinal angle of the sun. As shown in FIG. 2, in this Embodiment, the altitudinal shaft 30 is connected with transversal main turning shaft 2 via a reversing gear mechanism with a reduction ratio of 2:1, the bevel gear 27 and the rotating shaft 26 move in the reverse direction to the altitudinal bevel gear 31. As shown in FIG. 1-2, azimuth shaft 28 is connected with vertical shaft 8 via a synchronized tooth belt mechanism with a ratio of 1:1 and a gear driving mechanism(40' and 41) with a ratio of 1:1, and the relative movement between the azimuth shaft 28 and the vertical shaft 8 and bottom support 3 is like this: the motor 13 drives nut 16 to move on screw 14, to drive bottom support 3 to rotate around axial line ZZ' of vertical shaft 8, assuming that azimuth shaft 28 rotates by an angle of a clockwise with bottom support 3. Meanwhile, as vertical shaft 8 is fixed, i.e., the belt wheel 42 is fixed, but the synchronized toothed belt 39 rotates by an angle α clockwise with the bottom support 3,so the engaging point of belt wheel 42 rigidly fixed on vertical shaft 8 with the synchronized toothed belt 39 is forced to change continuously, to force belt wheel 40 to drive gear 40' to move counterclockwise by α, gear 40' in turn drives gear 41 to move clockwise by α, and this angle of movement is superimposed on the angle of a already moved by azimuth shaft 28, therefore azimuth shaft 28 has actually moved by 2α clockwise, so that the azimuth shaft 28 and bottom support 3 rotate around axial line ZZ' in the same direction at a speed ratio of 2:1.

Figure 4:
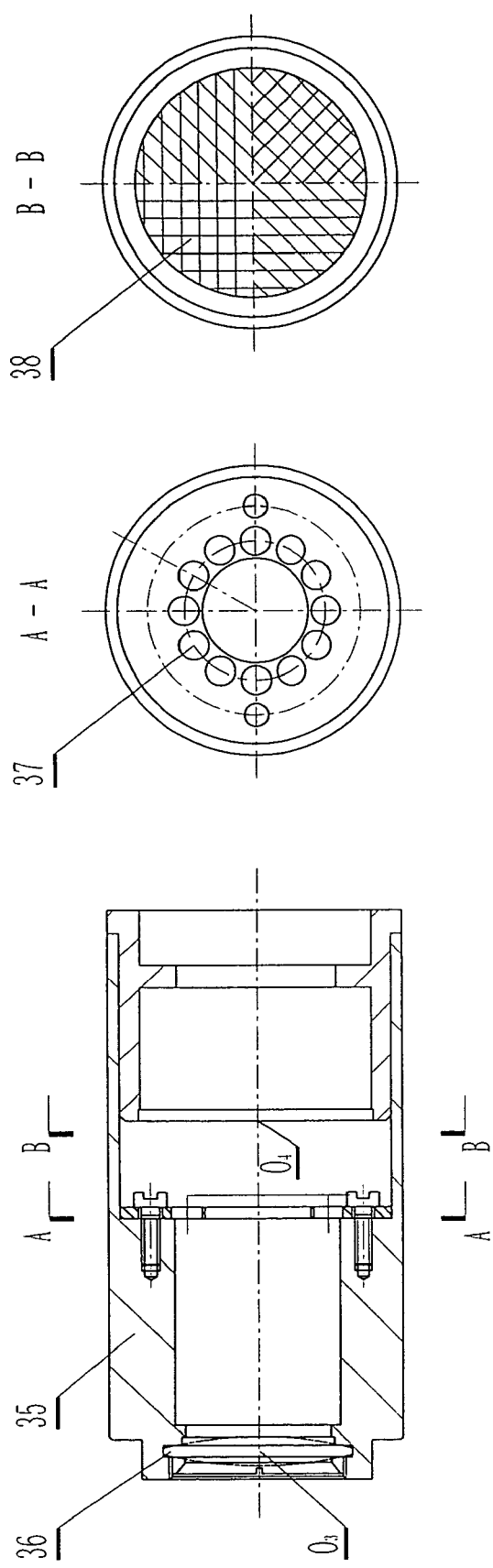
FIG. 4 is the schematic of the structure of the directed sensor in Embodiment 1.

The directed sensor 25 is as shown in FIG. 4. Its light sensing surface is facing the planar reflector 1', its central axial line coincides with the connecting line $O_1O'$, and it includes the post 35, lens 36 with $O_3$ as its center, photosensitive elements of single stage or more than one stage (shown as two stages 37 and 38 in this Embodiment). The lens 36 is on the top front of post 35. The photosensitive elements of two stages are located at different positions behind the lens. The first stage of photosensitive elements 37 comprises photosensitive diodes in annular distribution, and the last stage of photosensitive element 38 comprises a four-quadrant photosensitive element with $O_4$ as its center, located at the most rear of post 35, the central axial line of the directed sensor is the connecting line between $O_3$ and $O_4$. With the action of tracking sensor 18, the light is reflected from the planar reflector to directed sensor 25, and is focused by lens 36 into a light spot of proper size and projected to the photosensitive elements 37 or 38. Now the control circuit collects and processes the signals from photosensitive elements at different locations, to drive the device. The reflected sunlight will approach continuously to the center $O_4$ of the four-quadrant photosensitive element in the last stage, until the directed sensor central axial line $O_3O_4$ coincides with the connecting line $O_1O'$, the device has realized the directed projection of sunlight in the direction of $O_1O'$.

The whole device is operated in this way: first, the sensors and mechanisms are properly adjusted at the starting positions, so that the device is in the status of automatic operation. When the position of the sun changes, the sunlight tracking sensor 18 transmits the signals of changes in sun altitudinal angle and azimuth angle to the processing circuit, to respectively control the azimuth angle and altitudinal angle driving mechanisms. It first controls the azimuth angle driving mechanism to move nut 16 on screw 14, and further to rotate bottom support 3 around the axial line ZZ' of vertical shaft 8. As vertical shaft 8 is connected with azimuth shaft 28 via a driving mechanism, azimuth shaft 28 rotates accordingly, and the azimuth shaft 28 and bottom support 3 rotate around axial line ZZ' in the same direction at a speed ratio of 2:1. At this time, the electromagnetic clutch 33' on azimuth shaft 28 picks up the clutching plate 35', so that the formerly free azimuth bevel gear 29 forms a "rigid" like structure with this shaft 28 via the pin, as the rotating shaft 26 is pivoted at one end on sleeve 33 fixed on the azimuth shaft 28. In this way, rotation of azimuth shaft 28 will make azimuth bevel gear 29, shaft 26, bevel gear 27 and the sensor 18 on it rotate together with shaft 28 to adjust the E-W azimuth, while altitudinal bevel gear 31 remains free. Then it controls the altitudinal angle driving mechanism, motor 9 moves nut 12 on screw 10, and further rotates frame 5 around the axial line of transversal main turning shaft 2. At this time, the electromagnetic clutch 34 on altitudinal shaft 30 picks up the clutching plate 31', so that the formerly free altitudinal bevel gear 31 forms a "rigid" like structure with this shaft 30 via the pin. As the two electromagnetic clutch circuits are interlocked, the azimuth bevel gear 29 at this time is free again. The altitudinal bevel gear 31 brings the free azimuth bevel gear 29 to rotate, and with the action of the connection bridge by the azimuth bevel gear 29, the bevel gear 27 rotates in the reversed direction, so that the altitudinal shaft 30, rotating in the reversed direction to transversal main turning shaft 2, finally makes bevel gear 27 and sensor 18 move in the same S-N direction with the whole planar reflectors at a ratio of 2:1, until the planar reflectors have basically reached the desired tracking position. The change in azimuth angle and altitudinal angle of planar reflectors is respectively half of the change in azimuth angle and altitudinal angle of the sunlight. In other words, after the function of sunlight tracking sensor 18, the whole heliostat has entered the functioning range of directed sensor 25. Accurate direction fixing can be realized after the aligning function of the two stages of photosensitive elements 37 and 38.

As compared with previous heliostat devices, the heliostat device in this Embodiment has the following advantages:

(1) This device can perform functions of sun tracking and accurate projection in fixed direction on the basis of the sunlight tracking sensor 18, via the directed sensor 25 mounted in fixed projection direction to form multi-stage control sensors. It has overcome the shortcomings of previous devices with accumulated error and high cost in programmed control, poor stability and reliability in direction fixing by solely relying upon the sunlight tracking sensor, and has demonstrated better applicability.

(2) In this Embodiment, a specific transitional driving mechanism comprising three bevel gears and two electromagnetic clutches are used to realize driving of the integrated sensor 18 to detect the altitudinal angle and azimuth angle of the sun, so that the tracking sensor can track the position of the sun well, and the reflected light from planar reflectors is close to the projection direction. The design is smart and is based on scientific principle, only the structure seems little more complicated.

(3) Sleeve 7 is rigidly connected with bottom support 3 of the azimuth angle adjusting mechanism, and vertical shaft 8 is fixed on ground, so that the rotation central axial line ZZ' of the whole device with respect to azimuth angle has been established. The adjustment of both altitudinal angle and azimuth angle is accomplished by a screw and nut mechanism, and its acting force is applied all by an arm of force with a certain length, making it easy to drive. Four rollers 6, 6', 6" and 6''' are used to support the weight of the whole device, making it more stable.

In general, the structure of this Embodiment has the following advantages: stable foundation, small driving force, low power consumption by motor, and good resistance against wind, conventional and ordinary materials are selected and the machining and manufacture process is relatively simple and convenient, therefore the price will be significantly lower than existing heliostats, making it possible to lower the investment for power stations.

Embodiment 2

The structure of the heliostat device in this Embodiment is generally similar to that in Embodiment 1, with the difference that the transitional driving mechanism connecting vertical shaft 8 and transversal main turning shaft 2 with the sunlight tracking sensor 18 is a flexible shaft mechanism, instead of a specific mechanism comprising three bevel gears and two electromagnetic clutches.

Figures 1, 5:
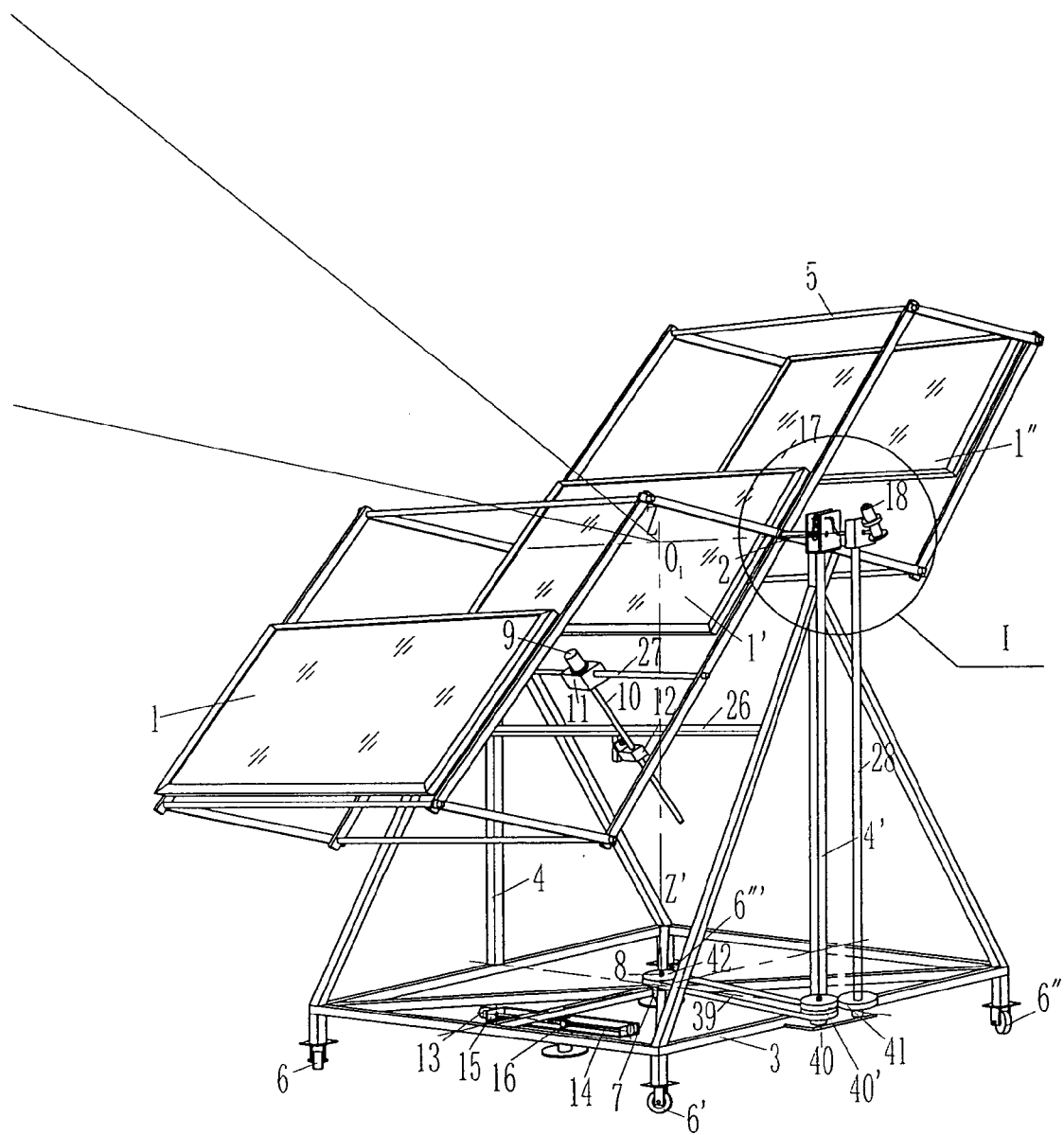
Figures 2, 5:
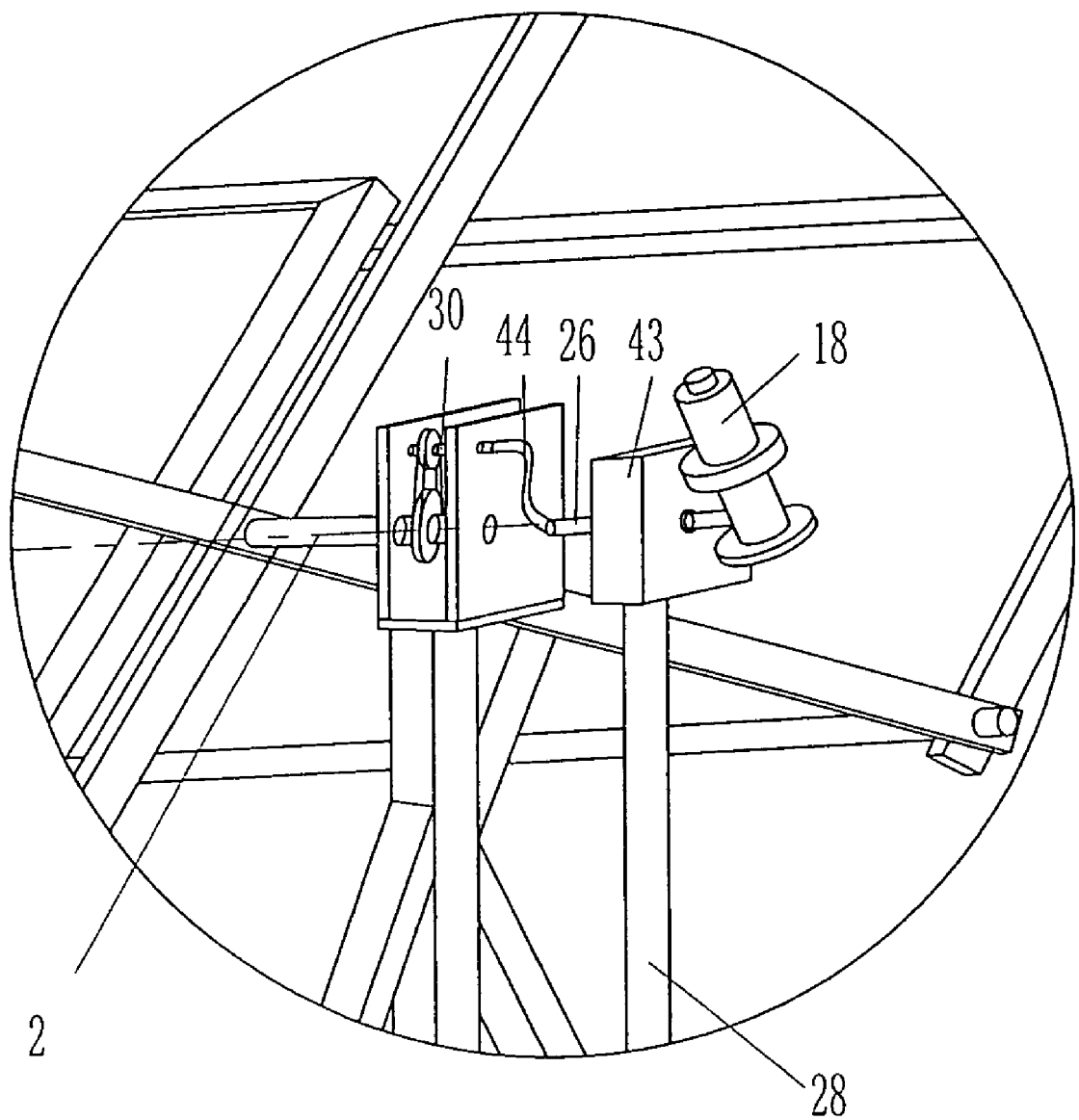
Figures 3, 5:
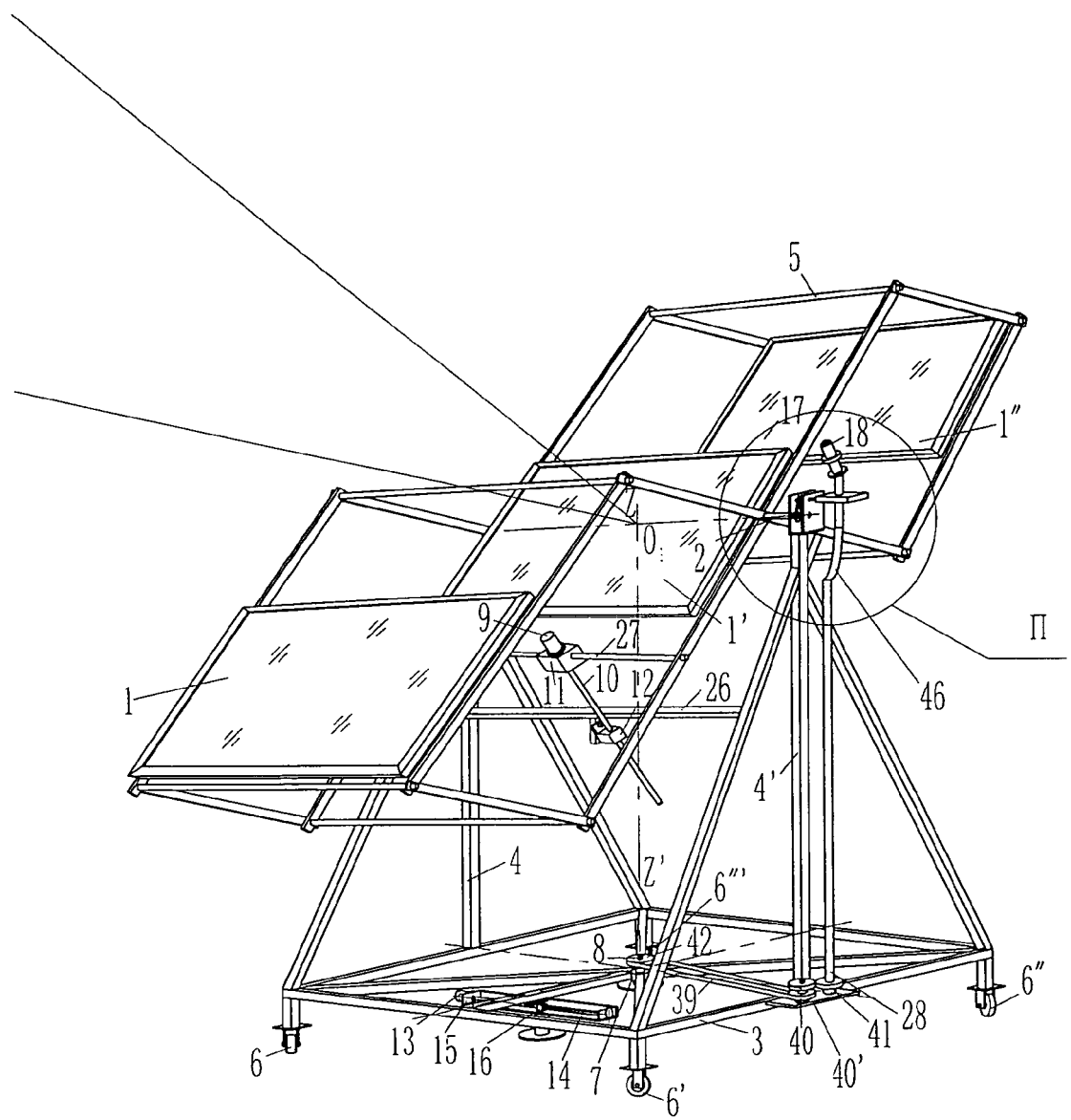
Figures 4, 5:
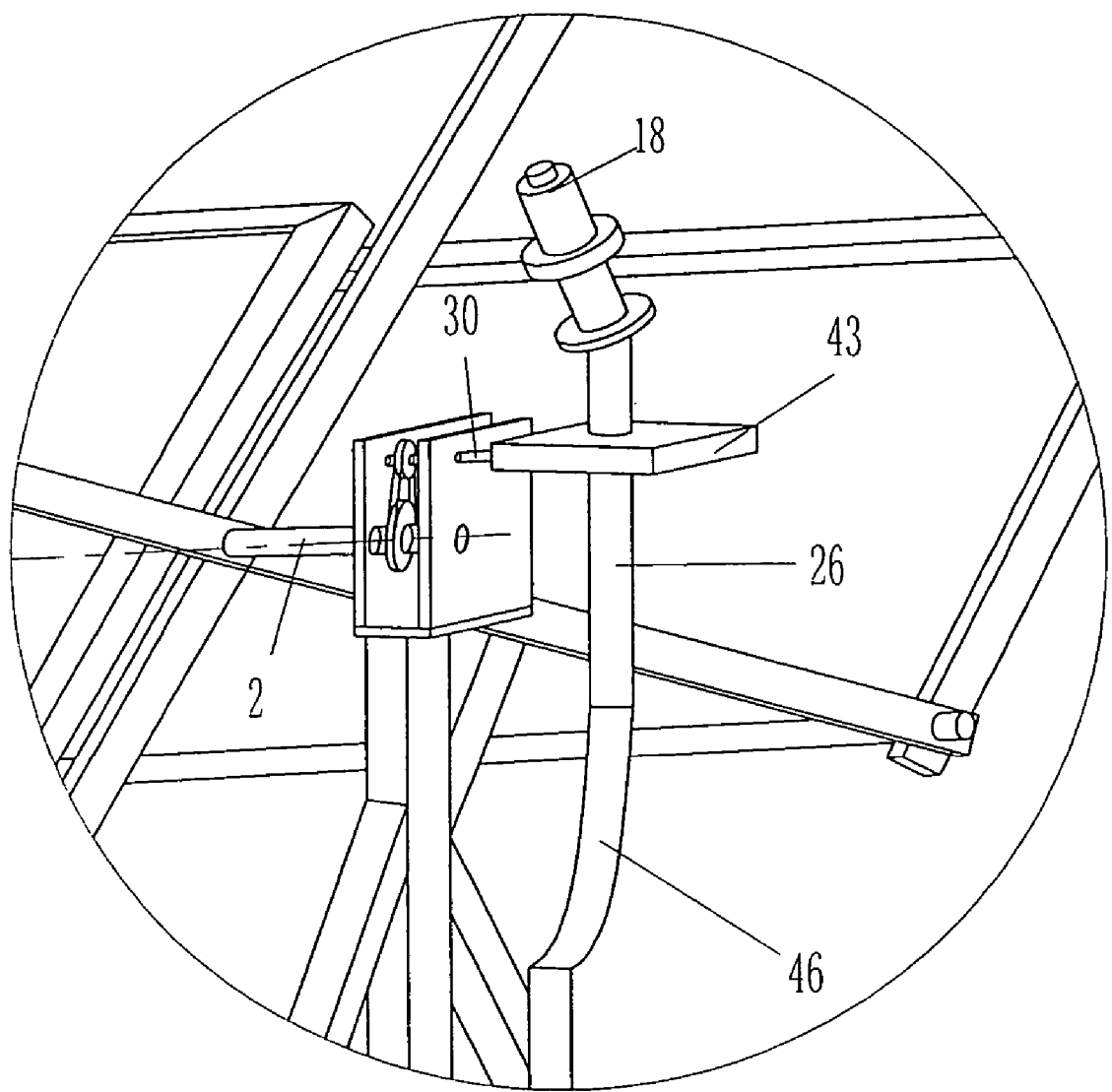

As shown in FIGS. 5-1 and 5-2, the said sunlight tracking sensor 18 is mounted on the rotating shaft 26 pivoted on abutment 43, which is fixed on the upper end of azimuth shaft 28, the said rotating shaft 26 is connected with altitudinal shaft 30 with the flexible shaft 44, the said azimuth shaft 28 is connected with vertical shaft 8 via the driving mechanism, the azimuth shaft 28 and bottom support 3 rotate around axial line ZZ' in the same direction at a speed ratio of 2:1, and the said altitudinal shaft 30 is connected with the transversal main turning shaft 2 via a speed reduction mechanism for the same direction with the reduction ratio of 2:1. In this way, when azimuth shaft 28 rotates, the abutment 43 and sensor 18 fixed on the top of azimuth shaft 28 rotate together with it. At the same time, rotation of altitudinal shaft 30 in turn transmits the rotating action to rotating shaft 26 via flexible shaft 44, so that sensor 18 rotates with turning shaft 26, until the sensor is aligned with the sun. Obviously, this Embodiment has also realized driving of the sensor 18 for integrated detection of altitudinal angle and azimuth angle of the sun, but in a structure much simpler.

Of course, the flexible shaft mechanism can also take another form, as shown in FIGS. 5-3 and 5-4, the said abutment 43 is fixed on one end of altitudinal shaft 30, the said rotating shaft 26 is connected with azimuth shaft 28 via flexible shaft 46, and the said azimuth shaft 28 is connected with vertical shaft 8 via the driving mechanism, the azimuth shaft 28 and bottom support 3 rotate around axial line ZZ' in the same direction at a speed ratio of 2:1, and the said altitudinal shaft 30 is connected with the transversal main turning shaft 2 via a speed reduction mechanism for the same direction with the reduction ratio of 2:1. The above-mentioned function is also realized.

Embodiment 3

Figure 6:
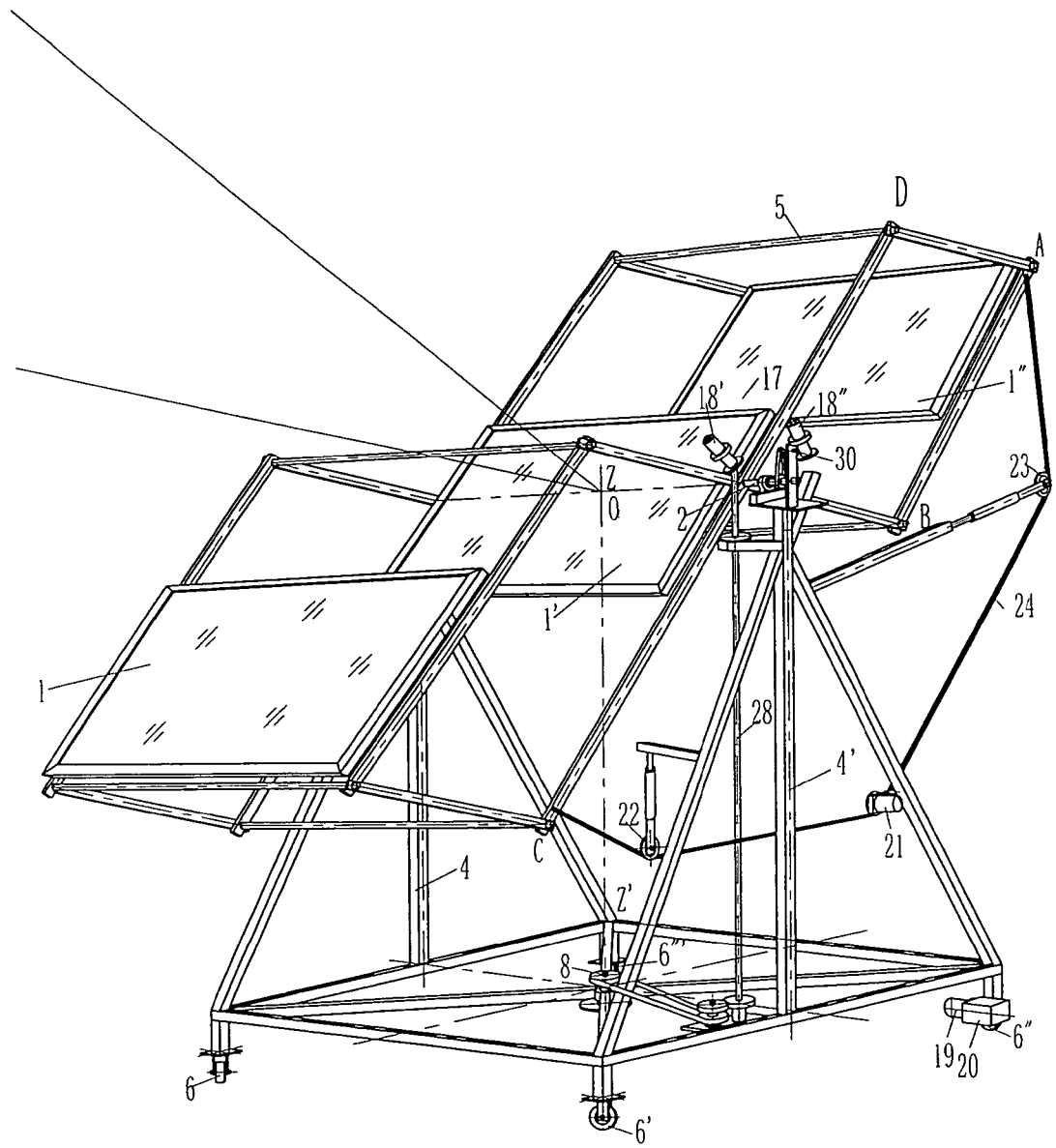
FIG. 6 is the schematic of the structure of a third example Embodiment.

The structure of the heliostat device in this Embodiment is as shown in FIG. 6. As compared with Embodiment 1, there are the following differences:

(1) The azimuth angle driving mechanism is different. It mainly comprises motor 19 and reducer 20, the input shaft of the said reducer 20 is connected with the motor shaft, its output shaft is connected with one of the rollers 6" on the bottom support. In this way, this roller becomes the driving roller, to push the bottom support 3 to rotate around the axial line ZZ' of vertical shaft 8, to realize adjustment of azimuth angle.

(2) The altitudinal angle driving mechanism is different. It mainly comprises motor 21, tensioning sprockets 22 and 23 with spring mechanism, motor output shaft sprocket and chain 24. The two ends of chain 24 are rigidly connected respectively with the two ends C and A of the connecting rods CD and AB of the parallel connecting rod mechanism and the chain 24 is engaged with tensioning sprockets 22 and 23 and motor output shaft sprocket. In this way, the motor 21 rotates to drive the sprocket, so that the engaging position of chain 24 with sprockets changes continuously, and frame 5 rotates around the axial line of the transversal turning shaft, to realize adjustment of altitudinal angle.

(3) The sunlight tracking sensor 18 comprises the altitudinal angle detector 18" mounted on altitudinal shaft 30 and the azimuth angle detector 18' mounted on azimuth shaft 28, the said altitudinal shaft 30 is connected with transversal main turning shaft 2 via a reduction mechanism for the same direction with a speed ratio of 2:1, the said azimuth angle 28 is connected with the vertical shaft 8 via the driving mechanism, and the azimuth shaft 28 and bottom support 3 rotate around axial line ZZ' in the same direction at a speed ratio of 2:1. In this way, the relatively complicated specific transitional driving mechanism comprising three bevel gears and two electromagnetic clutches is omitted, while the tracking function is still realized.

In addition to the above embodiments, there are still many other embodiments. For instance: (1) The intersecting point $O_1$ in space of the vertical shaft axial line with the axial line of the transversal main turning shaft is not restricted to an abstracted infinitely small point mathematically, and it can be an area around the intersecting point. Furthermore, the vertical shaft axial line and the axial line of transversal main turning shaft may not necessarily intersect, the axial line of the transversal main turning shaft can be as close as possible to the right front or rear of the vertical shaft axial line; now on the shortest connecting line of these two axial lines as close as possible, a point is set as $O_2$, the setting point $O_2$ basically coincides with the center of one of the planar reflectors, and the central axial line of the directed sensor coincides or is parallel with the connecting line $O_2O'$. In this case, this said area can also be an area near the point $O_2$. The center of the directed projection area can also be a point in the area near the center. (2) The relations of vertical shaft 8 and sleeve 7 in these Embodiments can be changed as appropriate, so that the vertical shaft 8 is located in the center of bottom support 3 and is in rigid connection with bottom support 3; the said sleeve 7 is fixed on the ground, with other parts changed accordingly. (3) In the altitudinal angle driving mechanism in Embodiment 1, the nut 12 is pivoted on the connecting member 27 of the two connecting rods of the parallel connecting rod mechanism, the supporting base 11 is pivoted on the connecting member 26 between the two vertical supports, and this will also drive the parallel connecting rod mechanism and the planar reflectors on it to rotate around the axial line of the transversal main turning shaft, to adjust the altitudinal angle of the planar reflectors and their mutual distance in the same way. (4) More than one directed sensor 25 can be mounted in different positions in fixed projection direction in the above Embodiments. (5) Mutual combined change of the altitudinal angle driving mechanism and azimuth angle driving mechanism in Embodiments 1 and 2 and so on. All equivalent or similar combined changes made on the basis of the teachings of this invention by technical personnel in this field shall be within the scope of this patent.

From the foregoing, persons of ordinary skill in the art will appreciate that heliostat devices have been provided, which can perform functions of sun tracking and accurately directed projection on the basis of the sunlight tracking sensor, via the directed sensor mounted in fixed projection direction to form multi-stage control sensors.

A disclosed heliostat device comprises planar reflectors and their frame, planar reflectors azimuth angle adjusting mechanism and altitudinal angle adjusting mechanism, and sunlight tracking sensor, the azimuth angle adjusting mechanism comprising a vertical shaft and its sleeve, a bottom support rotating around the central axial line (ZZ') of the vertical shaft, the altitudinal angle adjusting mechanism comprising at least one transversal main turning shaft parallel with the planar reflectors, the intersecting point (O1) in space of the said vertical shaft axial line and the transversal main turning shaft axial line or the setting point (O2) on the shortest connecting line between the two axial lines basically coincides with the center of one of the planar reflectors, and this device also includes a directed sensor with the light sensing surface facing the said planar reflector, and the central axial line of the directed sensor coincides or is parallel with the connecting line (O1O' ) or (O2O') of the said intersecting point (O1) or setting point (O2) with the center (O') of the directed projection area.

In this way, the device is first driven to rotate around the vertical shaft axial line and the transversal main turning shaft axial line under the control by the sunlight tracking sensor, to adjust the azimuth angle and altitudinal angle of the planar reflectors. When the change in altitudinal angle and azimuth angle of the normal line of the planar reflector is respectively half of the change in the altitudinal angle and azimuth angle of the sun as detected by the tracking sensor, the device is basically in the proper position. Now the device enters the functioning range of the directed sensor, while the tracking sensor does not function. The directed sensor start to work, until the central axial line of directed sensor coincides or is parallel with the connecting line O1O' or O2O' (i.e., the required directed projection direction), the planar reflectors can be accurately adjusted to the desired position.

Further, the said directed sensor comprises the post, lens with O3 as its center and photosensitive elements of single stage or more stages, the said lens being located in the top front of the post, the photosensitive elements of single stage or more stages behind the lens, the single stage or last stage of photosensitive elements comprising a four-quadrant photosensitive element with O4 as its center, located in the most rear of the post, the central axial line of the directed sensor is the connecting line between O3 and O4. As the directed sensor comprises a single stage or more than one stage of photosensitive elements, after the sunlight is reflected by the planar reflectors, its direction continuous approaches the desired projecting direction, and finally positioned in the direction pointed by the connecting line O1O' or O2O' . This device can perform functions of sun tracking and accurate projection in fixed direction on the basis of the sunlight tracking sensor, via the directed sensor mounted in fixed projection direction to form multi-stage control sensors. It has overcome the shortcomings of previous devices with accumulated error and high cost in programmed control, poor stability and reliability in direction fixing by solely relying upon the tracking sensor, and has demonstrated better applicability.

Although certain example methods and apparatus have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A heliostat device comprising:

planar reflectors and a frame, an azimuth angle adjusting mechanism, an altitudinal angle adjusting mechanism, a sunlight tracking sensor, the azimuth angle adjusting mechanism comprising a vertical shaft and a sleeve for the vertical shaft, a bottom support rotating around a central axial line (ZZ') of the vertical shaft, the altitudinal angle adjusting mechanism comprising at least one transversal main turning shaft parallel with the planar reflectors, the intersecting point ($O_1$) in space of the vertical shaft axial line and the transversal main turning shaft axial line or the setting point ($O_2$) on the shortest connecting line between the two axial lines coincides with the center of one of the planar reflectors, and a directed sensor with a light sensing surface facing the planar reflector, a central axial line of the directed sensor coincides or is parallel with the connecting line ($O_1O'$) or ($O_2O'$) of the intersecting point ($O_1$) or setting point ($O_2$) with the center (O') of the directed projection area.

2. A heliostat device as described in claim 1, wherein the directed sensor comprises:
a post, and
a lens with $O_3$ as its center and photosensitive elements of one or more stages, the lens being located in a top front of the post, the photosensitive elements being behind the lens, a least one of the stages of the photosensitive elements comprising a four-quadrant photosensitive element with $O_4$ as its center, located in a rear of the post, wherein the central axial line of the directed sensor is the connecting line between $O_3$ and $O_4$.

3. A heliostat device as described in claim 1, wherein the azimuth angle and the altitudinal angle of the sunlight tracking sensor change at a magnitude twice that of the change in the azimuth angle and the altitudinal angle of a normal line of the planar reflector.

4. A heliostat device as described in claim 3, wherein the vertical shaft or the sleeve of the vertical shaft of the azimuth angle adjusting mechanism is connected with an azimuth shaft via a driving mechanism, so that the azimuth shaft and the bottom support rotate around the central axial line of the vertical shaft in the same direction at a speed ratio of 2:1, and the transversal main turning shaft of the altitudinal angle adjusting mechanism is connected with an altitudinal shaft via a driving mechanism for reversed direction, a speed ratio of the driving mechanism connecting the altitudinal shaft with the transversal main turning shaft is 2:1, the sunlight tracking sensor is mounted on a rotating shaft rigidly fixed on a bevel gear, the rotating shaft is pivoted at one end on the sleeve rigidly fixed with the azimuth shaft, the bevel gear is engaged with an azimuth bevel gear freely rotating on the azimuth shaft, the azimuth bevel gear is engaged with an altitudinal bevel gear freely rotating on the altitudinal shaft, the altitudinal bevel gear on the altitudinal shaft and the bevel gear on the rotating shaft have substantially the same diameter; both the azimuth shaft and the altitudinal shaft are fixed with electromagnetic clutches that enable the freely rotating bevel gears to rotate with the shafts, and circuits of both electromagnetic clutches are interlocked.

5. A heliostat device as described in claim 3, wherein the vertical shaft or the sleeve of the vertical shaft of the azimuth angle adjusting mechanism is connected with an azimuth shaft via a driving mechanism, so that the azimuth shaft and the bottom support rotate around the central axial line of the vertical shaft in the same direction at a speed ratio of 2:1, and the transversal main turning shaft of the altitudinal angle adjusting mechanism is connected with an altitudinal shaft via a driving mechanism for the same direction, a speed ratio of the driving mechanism connecting the altitudinal shaft with the transversal main turning shaft is 2:1, the sunlight tracking sensor is mounted on a rotating shaft pivoted on an abutment, the abutment is fixed on an end of the azimuth shaft, the rotating shaft is connected with the altitudinal shaft via a flexible shaft.

6. A heliostat device as described in claim 3, wherein the vertical shaft or the sleeve of the vertical shaft of the azimuth angle adjusting mechanism is connected with an azimuth shaft via a driving mechanism, so that the azimuth shaft and the bottom support rotate around the central axial line of the vertical shaft in the same direction at a speed ratio of 2:1, and the transversal main turning shaft of the altitudinal angle adjusting mechanism is connected with an altitudinal shaft via a driving mechanism for the same direction, a speed ratio of the driving mechanism connecting the altitudinal shaft with the transversal main turning shaft is 2:1, the sunlight tracking sensor is mounted on a rotating shaft pivoted on an abutment, the abutment is fixed on an end of the altitudinal shaft, the rotating shaft is connected with the azimuth shaft via a flexible shaft.

7. A heliostat device as described in claim 3, wherein the vertical shaft or a sleeve of the vertical shaft of the azimuth angle adjusting mechanism is connected with an azimuth shaft via a driving mechanism, so that the azimuth shaft and the bottom support rotate around the central axial line of the vertical shaft in the same direction at a speed ratio of 2:1, and the transversal main turning shaft of the altitudinal angle adjusting mechanism is connected with an altitudinal shaft via a driving mechanism for the same direction, a speed ratio of the driving mechanism connecting the altitudinal shaft with the transversal main turning shaft is 2:1, the sunlight tracking sensor comprises the altitudinal angle detector mounted on the altitudinal shaft and the azimuth angle detector mounted on the azimuth angle.

8. A heliostat device as described in claim 1, wherein the frame is a parallel connecting rod mechanism, the planar reflectors are parallel with each other and are located symmetrically on the frame of the parallel connecting rod mechanism, the azimuth angle adjusting mechanism also comprises vertical supports fixed on both sides of the bottom support and the driving mechanism linked with the bottom support, the bottom support has at least three rollers supported on the ground, and the planar reflectors and the frame are rotatably supported on the vertical supports via the transversal main turning shaft.

9. A heliostat device as described in claim 8, wherein the azimuth angle driving mechanism comprises:
a motor,
a screw and a supporting base and a nut,
an output shaft of the motor connected with an end of the screw, the screw being supported on the supporting base and being spirally engaged with the nut, the nut being pivoted on the bottom support, and the supporting base being supported on the ground.

10. A heliostat device as described in claim 8, wherein the azimuth angle driving mechanism comprises:
a motor and a reducer,
an input shaft of the reducer is connected with a motor shaft, and
an output shaft is connected with one of the rollers of the bottom support.

11. A heliostat device as described in claim 8, wherein the altitudinal angle adjusting mechanism includes an altitudinal angle driving mechanism, the altitudinal angle driving mechanism comprises a motor and its supporting base, a screw and a nut, an output shaft of the motor being connected with an end of the screw, the nut or a supporting base being pivoted on a connecting rod or a connecting member of two connecting rods of the connecting rod mechanism, while an opposite end is pivoted on the connecting member of the vertical supports.

12. A heliostat device as described in claim 8, wherein the altitudinal angle adjusting mechanism includes an altitudinal angle driving mechanism, the altitudinal angle driving mechanism comprises a motor, two tensioning sprockets, a motor output shaft sprocket and a chain, the two tensioning sprockets being mounted on vertical supports, ends of the chain being rigidly fixed with respective ones of the connecting rods of the parallel connecting rod mechanism, the chain being engaged with the two tensioning sprockets and the motor output shaft sprocket.

* * * * *